United States Patent
Grimm (10) Patent No.: US 9,518,330 B2
(45) Date of Patent: Dec. 13, 2016

(54) ELECTROLYZING CELL FOR GENERATING HYDROGEN AND OXYGEN AND METHOD OF USE

(71) Applicant: Global Hydrogen Technologies, Inc., Clearwater, FL (US)

(72) Inventor: Helmuth E. Grimm, Clearwater, FL (US)

(73) Assignees: Global Hydrogen Technologies, Inc., Clearwater, FL (US); Helmuth E. Grimm, Clearwater, FL (US); Scott L. Harlib, New Port Richey, FL (US)

( * ) Notice: Subject to any disclaimer, the term of this patent is extended or adjusted under 35 U.S.C. 154(b) by 238 days.

(21) Appl. No.: 14/256,424

(22) Filed: Apr. 18, 2014

(65) Prior Publication Data
US 2014/0224647 A1    Aug. 14, 2014

Related U.S. Application Data

(63) Continuation of application No. PCT/US2011/057296, filed on Oct. 21, 2011.

(51) Int. Cl.
| | | |
|---|---|---|
| C25B 9/02 | (2006.01) | |
| C25B 1/08 | (2006.01) | |
| C25B 9/06 | (2006.01) | |

(52) U.S. Cl.
CPC . *C25B 9/02* (2013.01); *C25B 1/08* (2013.01); *C25B 9/063* (2013.01); *Y02E 60/366* (2013.01)

(58) Field of Classification Search
CPC ...................................................... C25B 9/063
(Continued)

(56) References Cited

U.S. PATENT DOCUMENTS

| | | | |
|---|---|---|---|
| 1,738,372 A | | 12/1929 | Edgeworth-Johnstone |
| 3,310,483 A | * | 3/1967 | Rhodes .................. C25B 9/066 |
| | | | 204/268 |

(Continued)

FOREIGN PATENT DOCUMENTS

| | | | | |
|---|---|---|---|---|
| ES | WO 2007132035 A1 | * | 11/2007 | ............... C25B 1/04 |
| SE | WO02/069424 A1 | | 9/2002 | |

OTHER PUBLICATIONS

"Hybridgen International" video, uploaded to YouTube on Feb. 10, 2009, available at https://www.youtube.com/watch?v=Ov_sT0nRCd0.*

(Continued)

*Primary Examiner* — Harry D Wilkins, III
(74) *Attorney, Agent, or Firm* — Robert J. Varkonyi; Smith & Hopen, P.A.

(57) ABSTRACT

An electrolytic cell used to electrolyze water and produce hydrogen and oxygen. The cell comprises nonconductive dividers, sandwiching neutral electrodes and designed for rapid flow of electrolyte through the cell to limit voltage loss. A positive electrode plate is disposed in the interstitial space of a nonconductive housing, adjacent to the neutral electrodes. At least one terminal connects to the positive electrode. A negative electrode seals the cell and is sealed with an o-ring. The cell may be mounted to a vehicle or other system using a mounting tab, which optionally also functions as a ground. The cell may use gravitic circulation or a circulating pump to cycle electrolyte. The electrolysis cell may be formed of different dimensions, based on the output needs and application, and may be wired in parallel or in series to suit system needs.

21 Claims, 9 Drawing Sheets

(58) Field of Classification Search
USPC .............................................. 204/268, 278.5
See application file for complete search history.

(56) References Cited

U.S. PATENT DOCUMENTS

| | | | |
|---|---|---|---|
| 3,615,838 A | 10/1971 | Erickson | |
| 3,779,889 A * | 12/1973 | Loftfield | C25B 9/063 204/268 |
| 3,893,902 A * | 7/1975 | Loftfield | C02F 1/4674 205/350 |
| 4,061,559 A | 12/1977 | Kitamura et al. | |
| 4,331,521 A | 5/1982 | Chisholm et al. | |
| 4,339,324 A * | 7/1982 | Haas | C25B 9/206 204/257 |
| 4,425,215 A | 1/1984 | Henes | |
| 4,585,539 A | 4/1986 | Edson | |
| 4,680,100 A | 7/1987 | Morin | |
| 4,800,163 A | 1/1989 | Hibi et al. | |
| 5,340,667 A | 8/1994 | Stinson et al. | |
| 5,534,120 A * | 7/1996 | Ando | C02F 1/4618 204/269 |
| 5,605,771 A | 2/1997 | Eidler et al. | |
| 6,849,172 B2 | 2/2005 | Rigby et al. | |
| 7,351,490 B2 | 4/2008 | Tanaka et al. | |
| 8,449,737 B2 * | 5/2013 | Richardson | C25B 1/04 204/268 |
| 8,591,708 B2 * | 11/2013 | Potchen | C25B 9/00 204/269 |
| 2004/0154918 A1 * | 8/2004 | Casbeer | C02F 1/46109 204/268 |
| 2010/0276279 A1 * | 11/2010 | Arnett | C25B 1/06 204/274 |
| 2011/0006544 A1 * | 1/2011 | Geurts | B63J 99/00 290/1 A |
| 2012/0118731 A1 * | 5/2012 | Liang | B01D 61/48 204/275.1 |

OTHER PUBLICATIONS

International Search Report and Written Opinion issued Jul. 2, 2012 for International Patent Application No. PCT/US2011/057296.
International Preliminary Report on Patentability issued May 1, 2014 for International Patent Application No. PCT/US2011/057296.
Wu, Jianzhong et al., "Interaction Between Like-Charged Colloidal Spheres in Electrolyte Solutions." Proc. Natl. Acad. Sci. USA. vol. 95 pp. 15169-15172, Dec. 1998.

* cited by examiner

ELECTROLYZING CELL FOR GENERATING HYDROGEN AND OXYGEN AND METHOD OF USE

CROSS-REFERENCE TO RELATED APPLICATIONS

This application is a continuation of and claims priority to International Patent Application No. PCT/US2011/057296, entitled: "Electrolyzing Cell for Generating Hydrogen and Oxygen and Method of Use," filed on Oct. 21, 2011, the contents of which are herein incorporated by reference.

FIELD OF INVENTION

This invention relates to an electrolyzing cell. More specifically, the invention is an electrolyzing cell having solid electrode plates providing simple method for controlling voltage loss without impeding electrolyte flow potential.

BACKGROUND OF THE INVENTION

Electrolysis cells consist of an anode, a cathode and plates in between the anode and cathode that are not directly connected to ground or power but are active by conductivity of the electrolyte. These are called "neutral plates" or bipolar plates. Some cells have holes in the anode and cathode as well as the neutral plates for allowing flow of electrolyte. However, these holes also create voltage loss. Alternative designs do not use holes in the electrode plates, as there is no circulation of electrolyte. However, these cells require periodic checks to maintain water level or drip-feed systems to replenish the cells. These cells also exhibit thermal runaway and/or the need for costly electronics to monitor and modulate current for prevention of overloads.

Other dry cells have internal or external manifolds to feed individual cells keeping cells isolated from each other, providing efficiency gains by eliminating voltage loss. These systems use a circulating reservoir for cooling, and small ports for moving electrolyte. The small ports created for the flow into each cell have the liability of becoming plugged or restricted by contaminants as well as electrolyte solids. They also create issues with leakage of electrolyte from the external manifolds. This results in reduced efficiency and increased maintenance requirements.

Most "Dry Cell" electrolyzers use plates with ports drilled in the plate surface to allow electrolyte flow and gas flow to circulate in the cell. These cells have large potential voltage leakage at each every plate, due in part to the ports cut into each plate for the bolts and flow paths when plates are sandwiched together. These ports create areas of voltage leakage between anode and cathode, with the edges of the holes leaking voltage around their entire circumference. Ports in neutral electrode plates between the anode and cathode allow a direct path for voltage between anode and cathode, with the edges of the holes leaking voltage around their entire circumference. Every plate having a port leaks voltage. These cells have efficiency limitations and they produce steam in addition to the gas created by electrolysis. Cells must be fully isolated to eliminate or reduce voltage leakage, using mechanical isolation. For example, Henes (U.S. Pat. No. 4,425,215) discloses an electrolyzer having a three-plate stacked cell which is bolted together with through-bolts, thereby creating a sandwiched arrangement. The cells may be used in series. However, stacked cells using such a design suffer from a final assembly that is very bulky, limiting its potential applications due to space constraints, such as in modern vehicles, where engine space is very limited. Further, the design results in substantial labor requirements during assembly, as different plates need to be arranged and isolated, and then the entire assembly must be bolted together.

Other advanced designs of dry cells use isolated individual cell components to prevent voltage loss. Edson (U.S. Pat. No. 4,585,539) discloses separating the cell into two solution chambers, one for anolyte and another for catholyte. The chambers are divided by a microporous membrane, such as alumina or other ceramic matrix, to allow ionic transfer while still separating electrolytes. Each cell is divided and the plurality of cells forms the complete stack. However, the cell requires mechanical isolation, with an extremely bulky design.

However, most electrolyzers in the art display significant voltage loss, due to ports provided in the various electrode plates. Most solutions provide for electrolyzers that require a large unwieldy cell stack using physical or mechanical isolation to address voltage loss. As such, the present art requires a simplified electrolyzer design which provides compact size with minimal or no voltage loss, efficiency, and ease of maintenance.

SUMMARY OF THE INVENTION

The electrolytic cell of the present invention is used to electrolyze water and produce hydrogen and oxygen. The cell arrangement is designed to allow rapid flow of electrolyte through the cell to enhance output and to create the designed "flow barrier" to limit voltage loss at the plate edges where the electrolyte flows in and out, without the need of mechanical barriers or membranes. The cell housing is formed of nonconductive and adapted to enclose the positive and neutral electrode plates of the cell, eliminating most voltage leak paths and forming a protective barrier to the potential of shorting that is common on dry cell designs. The housing may contain any shape known in the art as useful as an electrolytic cell. In some variations, the housing includes first and second transverse walls, each having an opening edge, a base edge, and two longitudinal edges. A third and fourth longitudinal walls, each having an opening edge, a base edge, and two transverse edges, connect to the transverse walls or are otherwise in communication with the first and second transverse walls via the transverse edges. A base having an interstitial face and exterior face, is connected or otherwise in communication with the base edge of the first and second transverse walls and third and fourth longitudinal walls, forming an interstitial space. However, other useful forms may be used, such as a circular electrolysis cell. In such a variation, the first through forth walls are a continuous cylindrical shape. The housing includes at least one positive terminal base aperture on the interstitial face of the base.

A positive electrode plate, formed of electroconductive material, is adapted to be dimensioned substantially identical to the interstitial face of the base. In some variations, the positive plate includes a plurality of electrolyte flow channel disposed on one edge of the positive electrode plate, and adjacent to the electrolye aperture. The electrolyte flow channels are formed by removing the corners of the positive plate, or having a concave or convex cut out. The positive electrode has at least one positive electrode terminal aperture on its face, which corresponds to the at least one positive terminal base aperture in the housing base. The positive electrode terminal aperture is optionally countersunk and adapted to allow at least one positive terminal to mount flush to the positive plate. In some variations, the at least one positive electrode terminal apertures further comprises a plurality of positive electrode terminal apertures, such as two apertures. However, the number of apertures may be modified by one skilled in the art. The positive electrode is disposed adjacent to the interstitial face of the base. At least one positive terminal, formed of electroconductive material, connects to the positive electrode via the positive electrode terminal aperture, and runs throughout the at least one positive terminal base aperture, and is in electrical communication with the positive electrode plate. Optionally, the at least one positive terminal also includes a terminal screw o-ring or silicon sealant.

A cassette is fitted adjacent to the positive electrode plate, in the interstitial space of the housing. The cassette comprises a plurality of dividers, made of nonconductive material, and a plurality of neutral electrodes. The dividers have an electrode face, with a plurality of electrode slots of a predetermined size disposed on the electrode face. The electrode slots are also spaced a predetermined distance apart from any other electrode slot or the edge of the divider, forming precise spacing. Exemplary spacing between each neutral plate includes spaces from $\frac{1}{16}$ inch to $\frac{1}{8}$ inch, such as 0.0625 inch, 0.062 inch, 0.0714 inch, 0.0833 inch, 0.01 inch, and 0.0125 inch. The neutral electrode plates are dimensioned similarly to the interstitial space, except smaller to accommodate the dividers. Each neutral electrode plate is placed in an individual electrode slot. The number of neutral plates may be any amount known in the art to be useful, such as from three to sixty neutral plates. Examples include five, ten, twenty, thirty, forty, or fifty neutral plates. The completed cassette forms electrolyte channels via the dividers, adjacent to two corners of the cassette. The channels are on one side of the cassette or on opposing corners of the cassette.

A negative plate, formed of electroconductive material, having substantially the same dimensions as the housing, is disposed on the opening edge of the housing. The present electrolyzing cell has one potential leak path as opposed to 14 in the prior art designs, such as Henes (U.S. Pat. No. 4,425,215), where the negative plate attaches to the cell casing. Sealers, such as an o-ring and/or sealant eliminate leakage. In some variations, a groove is disposed on the opening edge of the housing and adapted to accept an o-ring, rubber gasket, silicon sealant, such as Dow Corning® EA-6052, EA-6054, 90-006 Aerospace Sealant, 93-006 Aerospace Sealant, 94-031 Fluorosilicone Channel Sealant, HM-2500 Assembly Sealant, 700 Industrial Grade Silicone Sealant; epoxy sealants, such as those manufactured by Dow Corning® and Permatex; urethane sealants, such as Bostik® 2100 SPS Urethane Sealant, Sika Sikaflex-221 Non-Sag Polyurethane Sealant, Sika Sikaflex-221 Non-Sag Polyurethane Sealant, 3M 540 Polyurethane Adhesive/Sealant, 3M 4000 UV Marine Adhesive/Sealant 3M 550 and 551 Polyurethane Adhesive/Sealant, and sealants manufactured by Dow Corning; polyisobutylene (PIB) sealants, such as H. B. Fuller Window GmbH PIB-969S and sealants manufactured by Dow Corning; acrylic sealants, such as those manufactured by Dow Corning, polysulfide sealant, such as PRC Rapid Seal 650 Polysulfide Sealant, which interacts with the negative plate to seal the cell. Some variations of the cell include a plurality of case bolt apertures disposed on the opening edge of the housing, where the case bolt apertures extend through the housing or extend through a portion of the housing and a plurality of plate mounting holes are disposed on the negative plate, which correspond to the case bolt apertures. Alternatively, the negative plate is affixed to the housing a sealant glue, such as those described above. Where case bolt apertures extend through a portion of the housing, and not fully through the housing, the plurality of case bolt apertures are threaded such that the threaded apertures are adapted to accept a case bolt. A plurality of plate mounting holes are optionally disposed on a face of the negative plate, and correspond to the case bolt apertures, allowing bolts to fix the negative plate to the housing. In some variations, the plate mounting holes are countersunk. The electrolysis cell may also include a sealant disposed on the opening edge of the housing, wherein the sealant is silicone sealant, epoxy sealant, urethane sealant, polyisobutylene sealant, or acrylic sealant, such as those listed above.

The housing may also include a plurality of electrolye apertures extending from the exterior of the wall to the interstitial space, allowing flow of electrolyte from an exterior reservoir to the interstitial space. The electrolye apertures are optionally disposed on one face of a transverse wall, on one face of each transverse wall, on one face of a longitudinal wall, or on one face of each longitudinal wall. A plurality of electrolyte flow fittings are optionally connected to the plurality of electrolyte flow channels.

The electrolyte may be sodium hydroxide, potassium hydroxide, potassium carbonate, sea water, tap water, a suspension of colloidal elements in a liquid carrier, or electrolyte known in the art. Exemplary colloidal suspensions include compounds $MgO$, $ZnO$, $SrO$, $BaO$, $CaO$, $ZrO_2$, $Al_2O_3$, $SiO_2$, $SiC$, $Si_3N_4$, $BN$, $BaTiO_3$, or mixtures thereof (Kumar, et al., U.S. Pat. No. 6,986,970), aluminum hydroxide, sodium silicate in a sulfuric acid solution (Wang, U.S. Pat. No. 6,218,052). The compounds may be suspended in hydrophobic sols, ionic association colloids, polyelectrolytes, or other liquid, such as water.

The cell may also include at least one mounting tab, which is optionally nonconductive or electroconductive material. The mounting tab has a first face adapted to contact the negative plate and a second face used to attach mounting hardware, such as screws, bolts, or other fasteners known in the art. A plurality of mounting holes are disposed on the second face, and correspond to a plurality of holes on the negative plate. In some variations, the plurality of mounting holes are optionally countersunk.

The electrolysis cell may be used in a vehicle, as a hydrogen and oxygen gas-generating system. A flow control valve is optionally mounted on the intake manifold/plenum of the engine to allow adjustment of flow volume. The cell may be adapted to use gravitic circulation of electrolyte, such as by fitting an electrolyte reservoir above the electrolytic cell, or may use a circulating pump. The cell may optionally encompass an electrolyte level switch adapted to disengage a power relay in the event that the electrolyte level gets too low. A coalescer is optionally connected to the output flow aperture, and adapted to extract water vapor from the feed gas. A flashback arrestor may be attached to a flow line from the output flow aperture to the engine to protect the cell.

The electrode may be of any electroconductive material known in the art. Especially useful materials for the electrode include stainless steel, platinum, carbon, such as carbon nanofoam, titanium, gold, and titanium mixed metal oxide. Mixed metal oxide (MMO) materials made be formed as known in the art. Exemplary MMOs include a first material of $RuO_2$, $IrO_2$, or $PtO_{0.12}$, and a second material of titanium dioxide.

The cell casing (cell case) and divider materials may be any known non-conductive or insulating materials. Exemplary materials include polyoxybenzylmethylenglycolanhydride (Bakelite), Duroplast, epoxy resin, and reinforced plastic such as glass and graphite-reinforced plastic, polyimides, cyanate esters, acrylonitrile butadiene styrene (ABS), acrylic (PMMA), celluloid, cellulose acetate, cyclic olefin copolymer (COC), ethylene-vinyl acetate (EVA), ethylene vinyl alcohol (EVOH), fluoroplastics, such as polytetrafluoroethylene (PTFE), Fluorinated ethylene propylene FEP, Perfluoroalkoxy Plastic (tetrafluoroethylene with a perfluoralkyl vinyl ether; PFA), chlorotrifluoroethylene (CTFE), ethylene chlorotrifluoroethylene (ECTFE), ethylene tetrafluoroethylene (ETFE), Kydex™ (acrylic/PVC alloy), polyoxymethylene (Acetal), polyacrylonitrile (PAN or Acrylonitrile), polyamide (PA or Nylon), polyamide-imide (PAI), polyaryletherketone (PAEK), polybutadiene (PBD), polybutylene (PB), polybutylene terephthalate (PBT), polycaprolactone (PCL), polychlorotrifluoroethylene (PCTFE), polyethylene terephthalate (PET), polycyclohexylene dimethylene terephthalate (PCT), polycarbonate (PC), polyhydroxyalkanoates (PHAs), polyketone (PK), polyester, polyethylene (PE), polyetheretherketone (PEEK), polyetherketoneketone (PEKK), polyetherimide (PEI), polyethersulfone (PES), chlorinated polyethylene (CPE), polyimide (PI), polylactic acid (PLA), polymethylpentene (PMP), polyphenylene oxide (PPO), polyphenylene sulfide (PPS), polyphthalamide (PPA), polypropylene (PP), polystyrene (PS), polysulfone (PSU), polytrimethylene terephthalate (PTT), polyurethane (PU), polyvinyl acetate (PVA), polyvinyl chloride (PVC), polyvinylidene chloride (PVDC), and styrene-acrylonitrile (SAN). Especially useful materials include acrylic (all forms), lexan, delrin (all forms), high density polyethylene (HDPE), polypropylene (PP), nylon, and ultra high molecular weight polyethylene (UHMW).

The electrolysis cell may be formed of different dimensions, based on the output needs and application. It would be known to one skilled in the art how to scale the size of the cell for specific application. The cell not "stackable" as seen in conventional cells, as the stack is set and enclosed by the dividers which provide exact cell spacing and seal the plate edges eliminating areas of voltage loss common to dry cells with flow ports drilled in their electrodes. However, the cell may be wired in parallel or in series, or can be plumbed for electrolyte flow in parallel or series to suit system needs.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

The electrolytic cell of the present invention is used to electrolyze water and produce hydrogen and oxygen, in their natural ratio. The cell arrangement is designed to allow rapid flow of electrolyte through the cell to enhance output and to create the designed "flow barrier" to limit voltage loss at the plate edges where the electrolyte flows in and out, without the need of mechanical barriers or membranes. The cell housing is adapted to enclose the positive and neutral electrode plates of the cell, eliminating most voltage leak paths and forming a protective barrier to the potential of shorting that is common on dry cell designs. The electrolyzer cell is rapidly assembled as internal stack is a drop in arrangement provided by dividers. Cell efficiency is gained by unique flow barrier at ports adjacent to the corners of the neutral electrode plates, providing control of voltage loss. The ports may be located on side by side corners, i.e. on the same longitudinal edge of the neutral electrode plate, on the same transverse edge of the neutral electrode plate, or on opposing corners.

As used herein, "cell casing" or "housing" means a non-conductive or insulating material formed into a housing for the plate stack.

As used herein, "dividers" means a non-conductive or insulating material positioned between the electrode plates, and which maintains exact plate spacing and seals plate edges.

As used herein, "isolators" means a non-conductive or insulating material formed into a mounting tab or slat and which allows the cell to be isolated from ground for use in modulated applications.

As used herein, "liquid barrier" means a flow of liquid through a given space of sufficient velocity to increase resistance to parallel flow of electrical current.

As used herein, "positive plate", "positive electrode", or "positive electrode plate" means an electrically conductive material in a substantially flattened shape, disposed inside the cell casing, and providing positive current from the cell.

As used herein, "positive terminals" means an electro-conductive material which physically attaches the positive plate to the cell casing and serves as connection points for positive current.

As used herein, "neutral plates" or "bipolar plates" mean an electroconductive material in a substantially flattened shape, adapted to increase the active surface area, and which make up the plate stack.

As used herein, "negative plate", "negative electrode", or "negative electrode plate" means an electrically conductive material in a substantially flattened shape, disposed on the outside the cell casing, and providing negative current to and/or from the cell. The negative plate provides a ground for the cell and an attach point, and allows for attachment of modular mount system.

Example

Figure 1:
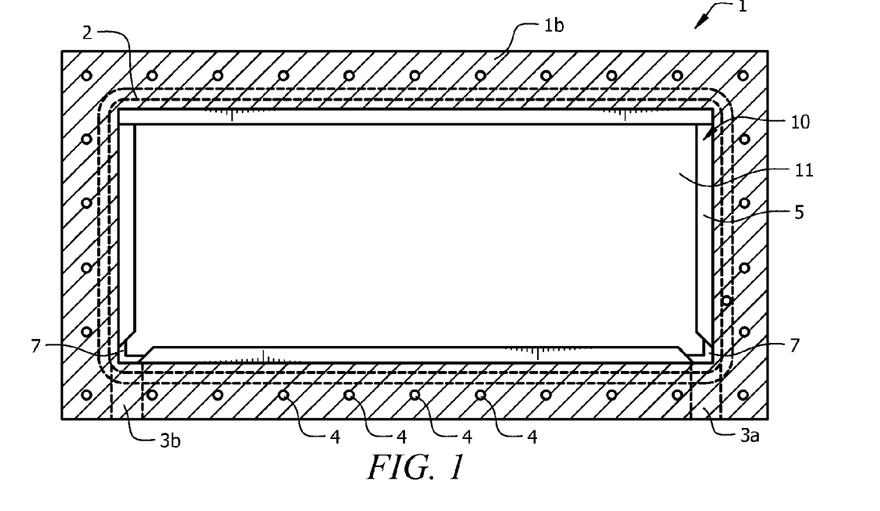
FIG. 1 is a top elevation of the electrolyzer cell, showing the electrolyte channels on the same side of the neutral plate. The top face of the housing, and upper-most neutral electrode and top edge of the divider is shown.
Figure 3:
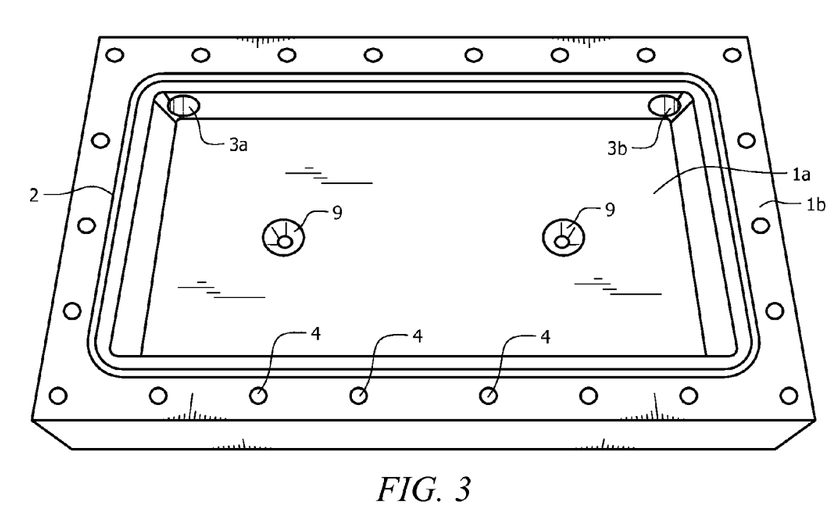
FIG. 3 is an isometric view of the electrolyzer cell housing showing electrolyte input and output apertures and the positive terminal apertures.

The electrolyzer cell comprises cassette 10 and positive plate 30 enclosed in housing 1, as seen in FIG. 1. Housing 1 is made from known non-conductive materials, such as acrylic, acetal, delrin, or plastic, and provides for pressure retention and rigidity to positive plate, thereby maintaining tolerances. Housing 1 includes an interstitial space adapted to accept cassette 10. Preferably, cassette 10 fits tightly into the interstitial space. The closed base of housing 1 forms positive electrode base 1a, with at least one opening provided in positive electrode base 1a, as seen in FIG. 3. The open, upper face of housing 1 forms negative electrode face 1b. A groove runs outside the interstitial space on negative electrode face 1b, forming case o-ring channel 2, which fits case o-ring 50, seen in FIG. 4. A plurality of electrolyte flow apertures 3a and 3b are providing running from the outside edge of housing 1 to the interstitial space, seen in FIG. 1. Electrolyte flow fittings 65 are connected to the electrolyte flow apertures at the edge of the plate stack, providing a means of attaching electrolyte tubing to the cell. The flow apertures may be used for input and output of electrolyte from the cell, such that apertures 3a forms an electrolyte input and 3b forms an electrolyte output. A plurality of case bolt apertures 4 extend through housing 1 from negative electrode face 1b toward positive electrode base 1a. Case bolt apertures 4 may extend through housing 1, or may extend through only a portion of housing 1. Where case bolt apertures 4 extend only partially through housing 1, the case bolt apertures are threaded allowing case bolt 55 to screw into the aperture.

Figure 2:
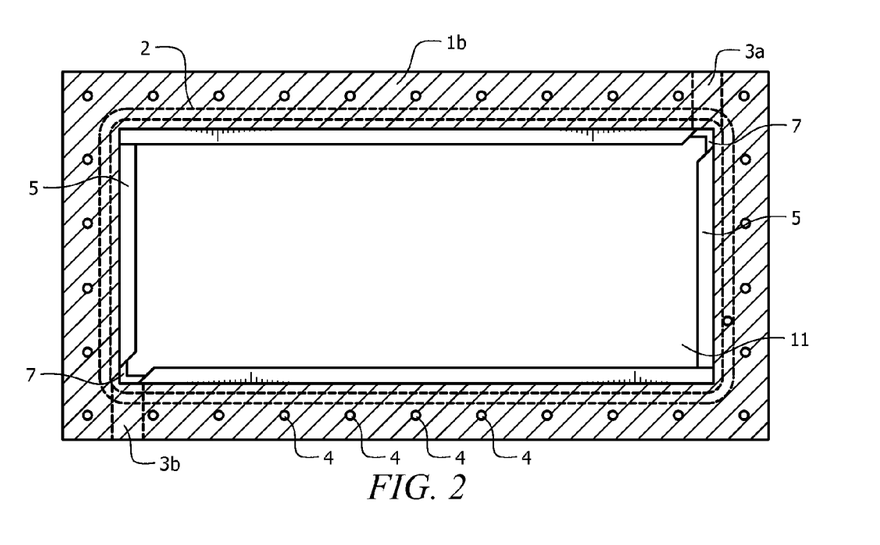
FIG. 2 is a top elevation of the electrolyzer cell, showing the electrolyte channels on opposing corners of the neutral plate. The top face of the housing, and upper-most neutral electrode and top edge of the divider is shown.
Figure 5A:
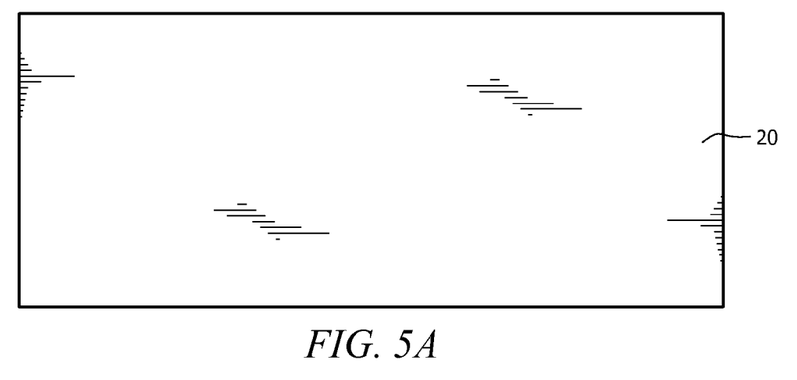
FIGS. 5(A) and (B) are top elevation views of the neutral plates. The neutral plates can include (A) full plates, (B) neutral plates with electrolyte channel openings, or a combination of the two.
Figure 5B:
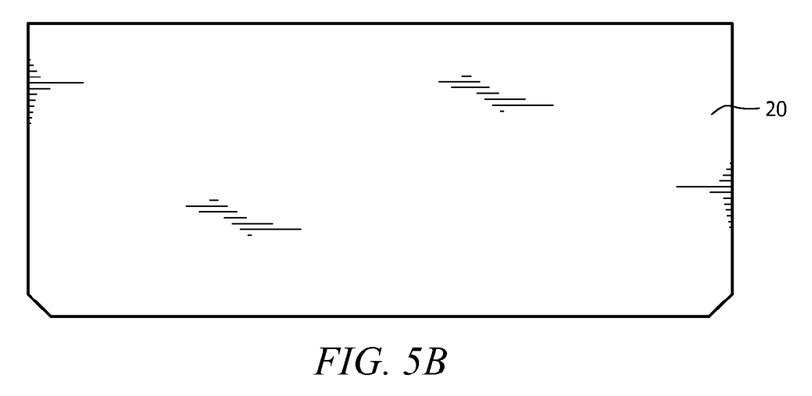
Figure 6:
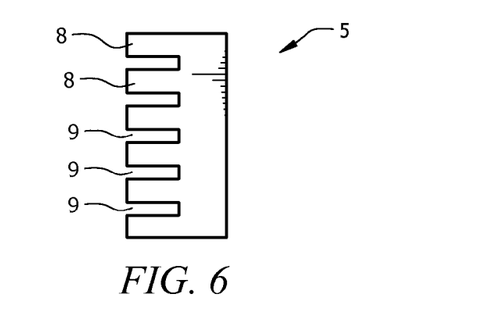
FIG. 6 is a cross sectional view of the divider, showing the spacing elements.

Cassette 10 is formed from a plurality of neutral plates 20, forming cell stack 11, fitted within dividers 5. Cassette 10 is designed for rapid assembly and ease of reconditioning the electrolytic cell. In some embodiments, cell stack 11 consists of five neutral plates of stainless steel, which are all identical as seen in FIGS. 5(A) and (B). Dividers 5 are made from HDPE or any known non-conductive materials, and are provided in a shape designed to surround neutral plate 20. Spaces between dividers 5 form electrolyte channel 7, which are disposed on the same side of neutral plate 20, as seen in FIG. 1, or on opposing corners of neutral plate 20, as seen in FIG. 2. Electrolyte channel 7 has precise gaps which optimize flow, thereby creating a "Liquid Barrier" to any potential voltage loss, such as by flowing the liquid at 1-8 quarts per minute using plate spacing at, or near, $1/16$ inch. Electrolyte channel 7 aligns with electrolyte flow openings 31a and 31b in positive plate 30, providing optimum flow potential compared with minimal voltage loss in the exposed areas of the plate edges. Dividers 5 include electrode spacer 8 and electrode slot 9, which are designed to fix each electrode in a specific orientation relative to the surrounding electrodes of the cell stack, as seen in FIG. 6. It is important that electrode spacer 8 and electrode slot 9 are manufactured to tight tolerances, such as by precision machining, ensuring that the neutral plates, i.e. electrodes, are separated by predetermined distances, and do not shift in the cell stack.

Figure 7:
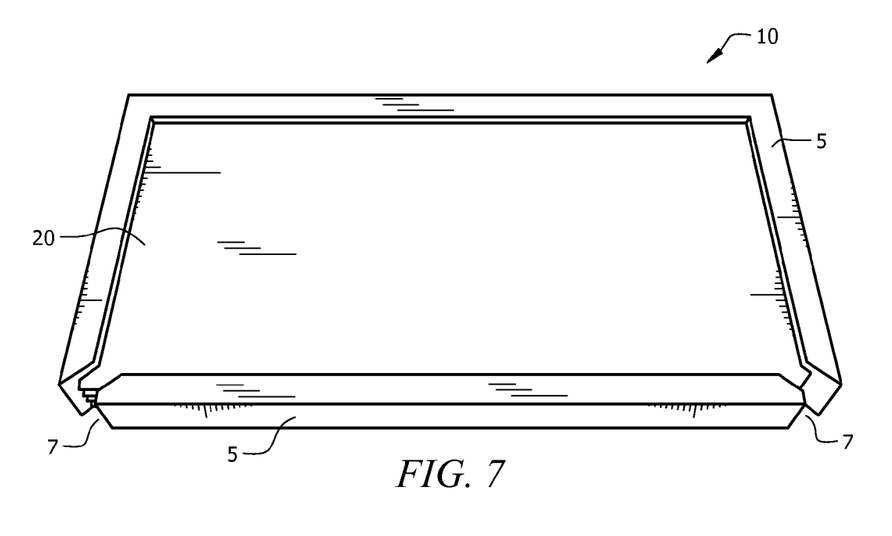
FIG. 7 is an isometric view of the neutral plate cassette, showing the electrolyte channels formed by the dividers.

Spacing of neutral plates between $1/16$ inch and $1/8$ inch provides optimum electrolytic performance. The neutral plates are positioned into the dividers using electrode slot 9, forming a cassette with electrolyte channel 7, seen in FIG. 7. Advantageously, cassette 10 provides for ease of assembly of the components and makes the cell easily refurbished. The cassette is pressed into the cell casing until it bottoms in the casing.

Figure 8:
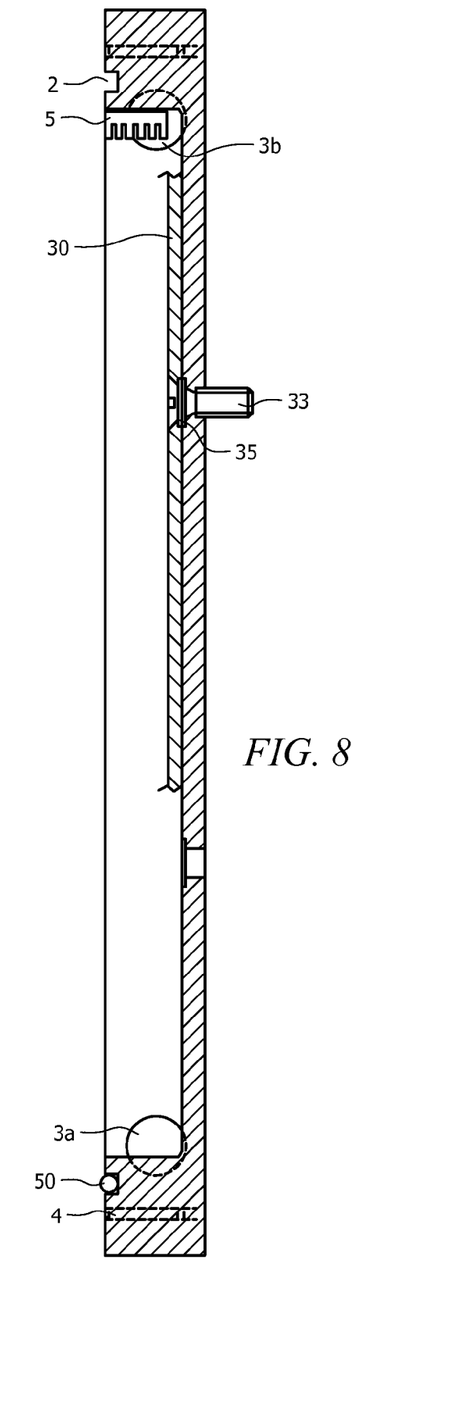
FIG. 8 is a cross sectional view of the electrolyzer cell, depicting the cell with the positive plate inserted and one terminal screw.
Figure 9:
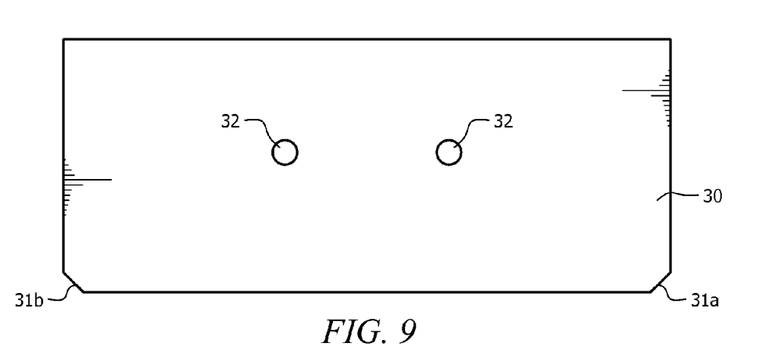
FIG. 9 is a top elevation view of the positive plate, showing the electrolyte flow apertures.

Positive plate 30 is disposed in the interstitial space adjacent to positive electrode base 1a, as seen in FIG. 8. Positive plate 30 is a stainless steel plate having a similar shape as the neutral plates, as seen in FIG. 9. Electrolyte flow openings 31a and 31b are provided adjacent to and allow for an area of inflow and outflow of electrolyte, reducing potential for leakage of current through electrolyte. Positive plate is cut back relative to neutral plates and negative plate. Housing 1 provides support to the positive plate. At least one aperture 32 is provided on positive plate 30 for accepting one terminal screw 33 per aperture. In some embodiments, aperture 32 is countersunk to allow terminal screw 33 to pass through the positive plate and provide a completely flat surface on the active surface of the positive plate. As seen in the figure, two apertures are used, however, one aperture or three or more apertures are also envisioned. Terminal screw 33 is fitted with terminal screw o-ring 35 and placed in aperture 32 and housing terminal aperture 9, fixing the position of positive plate 30, thereby sealing positive plate 30 and isolating the plate from the exterior environment. The terminal screw is fixed into position using nylon washer 36, washer 37, and nut 38. Nut 38 is torqued onto the terminal, effectively attaching the positive to the housing. Terminal screw 33 functions as an electrical terminal, or may be used for positive power connection. Nylon lock nut 34 is disposed on the end of terminal screw 33, providing a connector for electrical wiring or other equipment. Cassette 10 is fitted into the interstitial space above positive plate 30. Because of the design, no part of the positive plate is exposed to the exterior environment, and the positive plate is free from potential of short circuit.

Figure 4:
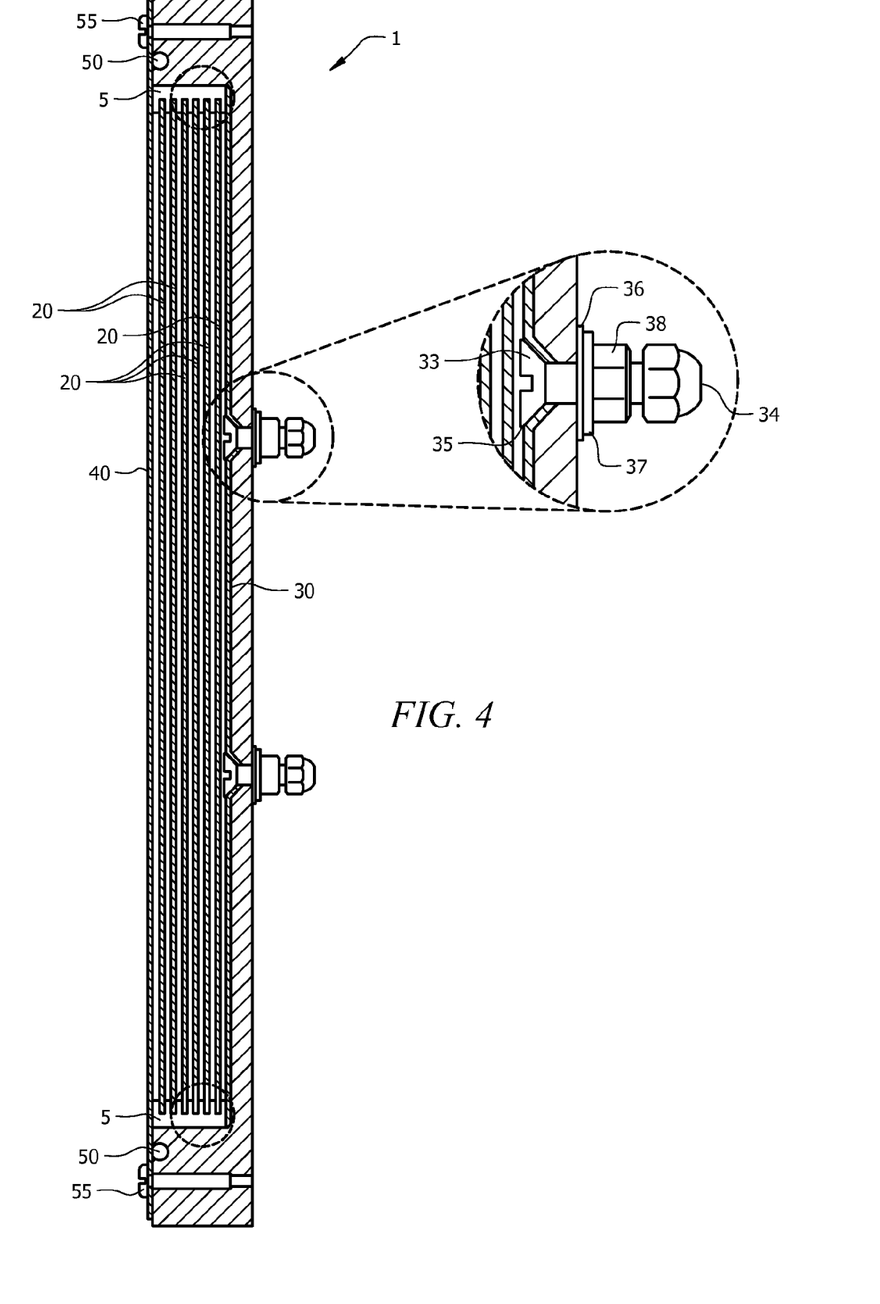
FIG. 4 is a cross sectional view of the electrolyzer cell, depicting the assembled cell.
Figure 10:
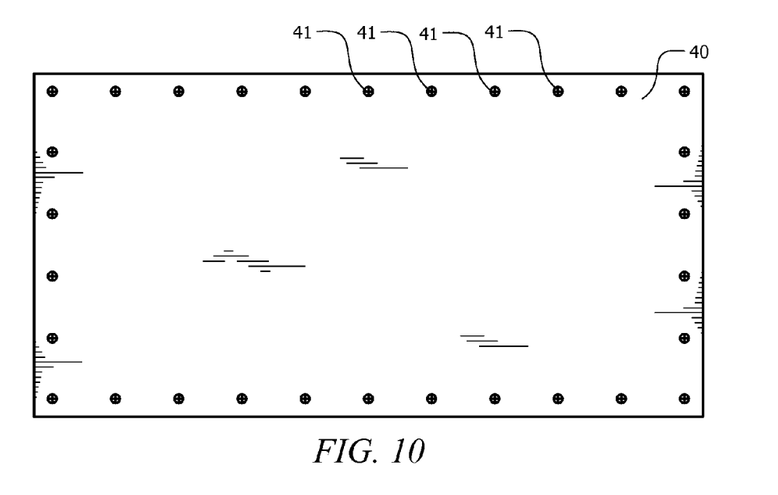
FIG. 10 is a top elevation view of the negative plate.

The interstitial space is sealed by negative plate 40, which is made of stainless steel and substantially the same size and shape as housing 1, as seen in FIGS. 4 and 10. A plurality of plate mounting holes 41 are disposed on the outer edge of negative plate 40 and correspond to case bolt apertures 4 in housing 1. Negative plate 40 fits onto negative electrode face 1b, and on case o-ring 50, as seen in FIG. 4. Case bolt 55 is disposed in plate mounting holes 41 and case bolt apertures 4, thereby retaining negative plate 40 to housing 1, and provides a clamping force required to create a tight, leak proof seal. Plate mounting holes 41 allow for attachment of the mounting system or modular attachment of cells.

Figure 11:
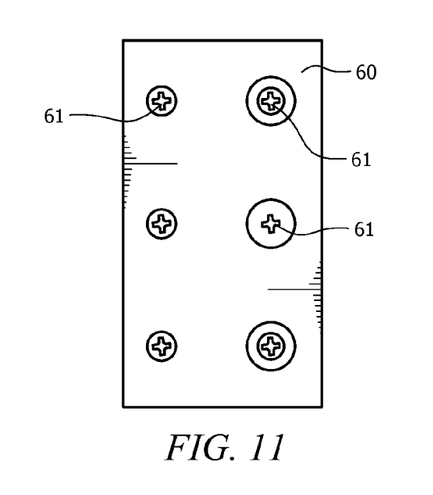
FIG. 11 is a top elevation view of the mounting tab.
Figure 12:
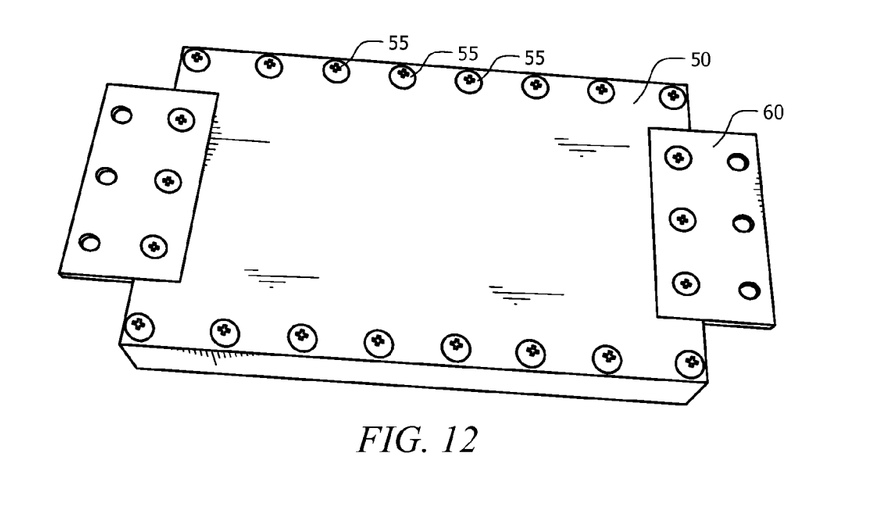
FIG. 12 is an isometric view of the electrolyzer cell assembled with the negative plate attached and two mounting tabs.
Figure 13:
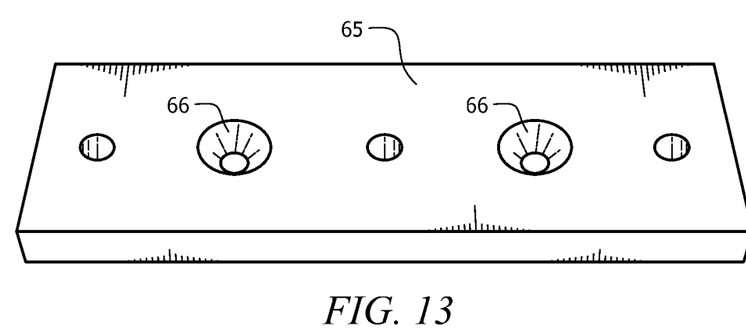
FIG. 13 is an isometric view of the isolator used with the electrolyzer cell.

The electrolyzer cell is optionally mounted using mounting tab 60, which is constructed from the same material as negative plate 40. Mounting tab 60 is adapted for use in any orientation around negative plate 40. A plurality of mounting holes 61 are disposed through the face of mounting tab 60, as seen in FIG. 11. Mounting holes 61 correspond to the spacing of plate mounting holes 41, allowing the mounting tab to be affixed to negative plate 40 using plate mounting holes 41, as seen in FIG. 12. Further, multiple mounting tabs are optionally used to secure the electrolyzer cell. Isolator 65, seen in FIG. 13, may be used in place of mounting tab 60, or in conjunction with the mounting tab. Isolator mounting apertures 66 are deeply countersunk, such that a screw or bolt attaching to the isolator is recessed in the isolator, eliminating any possible grounding of the bolt or screw to other metal surfaces.

An electrolyzer cell was assembled using the elements described above. Positive plate 30 was fitted into the interstitial space of housing 1, such that electrolyte flow openings 31a and 31b were directly adjacent to electrolyte flow apertures 3a and 3b. Terminal screw 33 was fitted with terminal screw o-ring 35 and placed into aperture 32. Nylon washer 36, washer 37, and nut 38 were affixed to terminal screw 33 on the exterior face of housing 1 and tightened. Nylon lock nut 34 was affixed to the end of terminal screw 33.

Cassette 10 was prepared using five neutral plates, as seen in FIG. 4. Each plate was fitted into an electrode slot of divider 5, such that the plate edges slid into the electrode slot. Once the neutral plates were inserted into a divider, a second divider was attached to the opposite edge of the neutral plates, circumferencing the plates except for two electrolyte flow channels of precise size. The cassette was fitted into the interstitial space, such that the neutral plates sit above the positive plate, separated by a portion of the divider.

Figure 14:
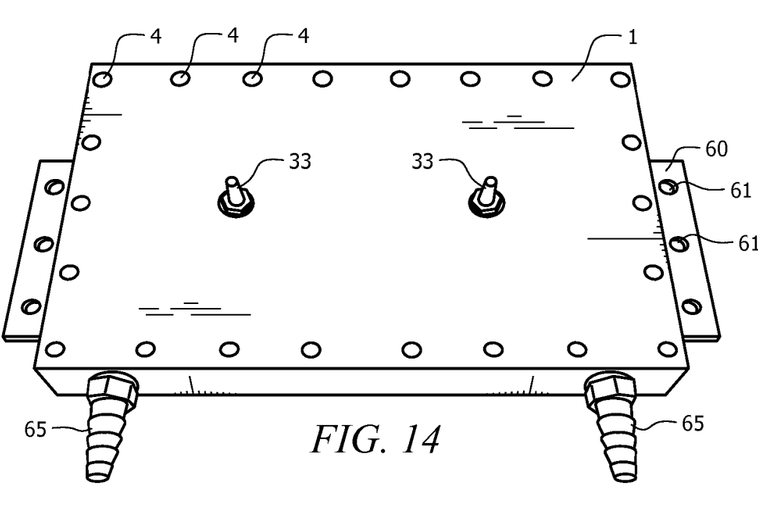
FIG. 14 is an isometric view of the electrolyzer cell showing electrolyte flow fittings inserted into the electrolyte flow apertures.

Case o-ring channel 2 was cleaned and prepared with sealant and case o-ring 50 was inserted into the o-ring channel. Sealant was applied to the mating surface of the o-ring, where the negative plate is attached to the cell casing, and the negative plate was placed onto the cell casing and secured with casing screws. Two electrolyte flow fittings were cleaned and prepared with sealant and threaded into electrolyte flow apertures and torqued, as seen in FIG. 14. Where the mounting tab is used, at least one case bolt 55 was not inserted into plate mounting holes 41 during fixing of the negative plate, corresponding to the location for the mounting tab. The mounting tab was placed on the negative plate, aligning mounting holes 61 with plate mounting holes 41 and inserting a bolt through the mounting holes. The bolt was torqued, fixing the mounting tab to the negative plate. The mounting plate was then used to mount the electrolyzer cell to a chassis or vehicle using any free mounting holes. This advantageously grounds the negative plate directly to chassis or vehicle ground. Direct grounding of generator provides simplicity of allowing single wire, i.e. one positive wire, connection. Alternatively, the mounting tab may be made of an insulating material, providing a non-grounded mounting of the cell or mounting the cell on isolators of non-conductive material, for use with electronic modulator to control DC current. Isolators make possible the mounting of cell with no ground contact.

Example

A cell was prepared using six cells in series. Voltage was divided amongst the cells, with each cell operating at about 2.25 volts in a 13.5 volt system. Twenty four volt systems used two generators run in series sharing voltage and arriving at the same voltage per cell. Electrolyte was circulated through the electrolyte flow apertures and returned to a reservoir allowing dissipation of heat. Testing showed the dynamics of the cell prevented any thermal runaway. The "dividers" surround the periphery of neutral plates with exception of flow ports, which are positioned variously at corners of cell stack for electrolyte flow. The dimensions of the flow channels reduced voltage loss by virtue of "electrolyte flow barrier". Of particular note, the perimeter of the neutral plates was isolated from the other plates, eliminating voltage loss common in a wet cell electrolyzer or a common dry cell.

The "electrolyte flow bather" was formed by running the electrolyte liquid through the cell at such a rate as to increase resistance to current flow at edges of plates where voltage loss normally occurs. On the inlet port there is a solid flow of electrolyte liquid passing the plate edges reducing conductivity through the electrolyte. On the outlet port there is a stream of hydroxy gas in combination with the electrolyte liquid. The interspersed gas in liquid further reduces conductivity of the electrolyte in the region of the plate edges where conventional cell designs lose voltage.

The cell was connected to a 2005 Kenworth Detroit Series 60 truck, with a 12.7 L engine, and used the vehicle's on-board power from the charging system to electrolyze distilled water/electrolyte to produce hydrogen and oxygen, to thereby enhance the combustion of the vehicle's hydrocarbon fuel in the engine. A flow control valve was mounted on the intake manifold/plenum of the engine to allow adjustment of flow volume. The cell was designed to use natural gravitic circulation, with the reservoir above the electrolyzer cell. The gravitic circulation of electrolyte through the cell to dissipate heat and maintain a homogenous electrolyte mixture where all electrolyte in system maintains approximately the same temperature. The design also encompasses an electrolyte level switch to disengage a power relay in the event that the electrolyte level gets too low. The level switch provides a safety factor to eliminate potential for running the system dry or inefficiently. A coalescer was fitted to the output flow aperture to extract water vapor from the feed gas, and condense the water vapor for return it to the electrolyte reservoir. This reduced water consumption of the cell and eliminates water vapor ingestion into the engine intake.

The design was found to surprisingly provide a high efficiency rating of hydroxy output, as seen in the Table. Tests of the cell were conducted at ambient temperature, with approximately a maximum temperature variation of 10° F. The circulation pump generated 6.667 liter/minute of hydroxy gas.

The Table. Efficiency gains provided by "Flow Barrier" of electrolyte in the flow ports.

| Pump type | Amperage | Voltage | Flow rate of electrolyte (Qt per Min.) | Flow rating (MMW, mL per Min. per Watt) |
| --- | --- | --- | --- | --- |
| gravitic | 13 | 13.5 | 1 | 5.698 |
| gravitic | 25 | 12.1 | 2 | 6.612 |
| circulation | 50 | 14 | 1.8* | 9.5 |

MMW ratings not corrected for ambient temperature.
*Data presented in gallons per minute The system was tested for use in turbocharger applications. The cell generated sufficient hydroxy gas to allow for the injection of hydroxy gas into the intake stream before or after a turbo, if the engine is turbocharged. The cell has been tested at a pressure of over 100 P.S.I. A flashback arrestor, as is known in the art, was attached to a flow line from the output flow aperture to the engine to protect the cell. The cell was run at 19 amps, showing an improvement of 24% in the efficiency of the engine, as determined by "miles per gallon".

In the preceding specification, all documents, acts, or information disclosed does not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

While there has been described and illustrated specific embodiments of an electrolyzing cell, it will be apparent to those skilled in the art that variations and modifications are possible without deviating from the broad spirit and principle of the present invention. It is also to be understood that the following claims are intended to cover all of the generic and specific features of the invention herein described, and all statements of the scope of the invention which, as a matter of language, might be said to fall therebetween.

What is claimed is:

1. An electrolysis cell, comprising
a housing formed of nonconductive material, wherein the housing comprises
   a first and second transverse walls, having an opening edge, a base edge, and two longitudinal edges;
   a third and fourth longitudinal walls, having an opening edge, a base edge, and two transverse edges, wherein the transverse edges are disposed in communication with the first and second transverse walls;
   a base having an interstitial face and exterior face, disposed in communication with the base edge of the first and second transverse walls and third and fourth longitudinal walls, thereby defining an interstitial space;
   wherein at least one positive terminal base aperture is disposed in the interstitial face of the base;
a positive electrode plate formed of electroconductive material disposed adjacent to the interstitial face of the base, wherein the positive electrode is adapted to be dimensioned substantially identical to the interstitial face of the base;
   wherein at least one positive electrode terminal aperture is disposed on a face of the positive electrode, and where the at least one positive electrode terminal aperture is in communication with the at least one positive terminal base aperture;
at least one positive terminal formed of electroconductive material disposed in the at least one positive electrode terminal aperture and the at least one positive terminal base aperture, and is in electrical communication with the positive electrode plate;
a cassette disposed in the interstitial space, wherein the cassette comprises:
   a plurality of dividers, wherein the dividers comprise:
      an electrode face, wherein a plurality of electrode slots are disposed on the electrode face;
      where the electrode slots are a predetermined size, where the electrode slots are spaced a predetermined distance apart from any other electrode slot or the edge of the divider;
      wherein the plurality of dividers are adapted to form electrolyte channels adjacent to two corners of the cassette, where the channels are on one side of the cassette or on opposing corners of the cassette;
   a plurality of neutral electrodes disposed in the electrode slots; and
a negative plate formed of electroconductive material disposed and of substantially the same dimensions as the housing, disposed on the opening edge of the housing.

2. The electrolysis cell of claim 1, further comprising a plurality of electrolyte apertures disposed on one face of a transverse wall, on one face of each transverse wall, on one face of a longitudinal wall, or on one face of each longitudinal wall.

3. The electrolysis cell of claim 2, further comprising a plurality of electrolyte flow channel disposed on one edge of the positive electrode plate, and adjacent to the electrolyte apertures;
   wherein the electrolyte flow channel comprises a cut out from the positive electrode plate having triangular, concave, or convex shape.

4. The electrolysis cell of claim 2, further comprising a plurality of electrolyte flow fittings disposed in the plurality of electrolyte flow channels.

5. The electrolysis cell of claim 1, wherein the electroconductive material is stainless steel, titanium, mixed metal oxide, MMO, platinum, carbon, carbon nanofoam, titanium mixed metal oxide comprising $RuO_2$, titanium mixed metal oxide comprising $RuO_2$, titanium mixed metal oxide comprising $IrO_2$, or titanium mixed metal oxide comprising $PtO_{0.12}$.

6. The electrolysis cell of claim 1, wherein the nonconductive material is acrylic, acetal, delrin, plastic, lexan, high density polyethylene, polypropylene, nylon, ultra-high molecular weight polyethylene, polyoxybenzylmethylenglycolanhydride, epoxy resin, polyimide, acrylonitrile butadiene styrene, acrylic, celluloid, cellulose acetate, cyclic olefin copolymer, ethylene-vinyl acetate, ethylene vinyl alcohol, polytetrafluoroethylene, fluorinated ethylene propylene, perfluoroalkoxy plastic, chlorotrifluoroethylene, ethylene chlorotrifluoroethylene, ethylene tetrafluoroethylene, polyacrylonitrile, polyamide-imide, polyaryletherketone, polybutadiene, polybutylene, polybutylene terephthalate, polycaprolactone, polychlorotrifluoroethylene, polyethylene terephthalate, polycyclohexylene dimethylene terephthalate, polycarbonate, polyhydroxyalkanoates, polyketone, polyester, polyethylene, polyetheretherketone, polyetherketoneketone, polyetherimide, polyethersulfone, chlorinated polyethylene, polyimide, polylactic acid, polymethylpentene, polyphenylene oxide, polyphenylene sulfide, polyphthalamide, polypropylene, polystyrene, polysulfone, polytrimethylene terephthalate, polyurethane, polyvinyl acetate, polyvinyl chloride, polyvinylidene chloride, or styrene-acrylonitrile.

7. The electrolysis cell of claim 1, further comprising a groove disposed on the opening edge of the housing and adapted to accept an o-ring or rubber gasket.

8. The electrolysis cell of claim 7, further comprising an o-ring disposed in the groove.

9. The electrolysis cell of claim 1, further comprising a plurality of case bolt apertures disposed on the opening edge of the housing, where the case bolt apertures extend through the housing or extend through a portion of the housing and wherein a plurality of plate mounting holes are disposed on the negative plate,
   where the plate mounting holes correspond to the case bolt apertures.

10. The electrolysis cell of claim 9, wherein the plurality of case bolt apertures extend through a portion of the housing, and
   wherein the plurality of case bolt apertures are threaded such that the threaded apertures are adapted to accept a case bolt.

11. The electrolysis cell of claim 1, wherein the cassette comprises five neutral plates.

12. The electrolysis cell of claim 1, wherein the positive electrode terminal aperture is countersunk and adapted to allow at least one positive terminal to mount flush to the positive plate.

13. The electrolysis cell of claim 1, wherein the at least one positive electrode terminal apertures further comprises a plurality of positive electrode terminal apertures.

14. The electrolysis cell of claim 13, wherein the plurality of positive electrode terminal apertures further comprises two apertures.

15. The electrolysis cell of claim 1, further comprising a terminal screw o-ring disposed on the at least one positive terminal.

16. The electrolysis cell of claim 1, further comprising a plurality of plate mounting holes disposed on a face of the negative plate.

17. The electrolysis cell of claim 16, wherein the plurality of plate mounting holes are countersunk.

18. The electrolysis cell of claim 1, further comprising at least one mounting tab further comprising
a first face and a second face, wherein the first face is adapted to contact the negative plate; and
a plurality of mounting holes disposed on the second face, wherein the mounting holes correspond to a plurality of holes on the negative plate.

19. The electrolysis cell of claim 18, wherein the plurality of mounting holes are countersunk.

20. The electrolysis cell of claim 18, wherein the plurality of mounting holes correspond to a plurality of plate mounting holes disposed on the negative plate, and wherein
a plurality of case bolt apertures disposed on the opening edge of the housing, where the case bolt apertures extend through the housing or extend through a portion of the housing and wherein the plurality of plate mounting holes correspond to the case bolt apertures.

21. The electrolysis cell of claim 1, further comprising a sealant disposed on the opening edge of the housing, wherein the sealant is silicone sealant, silicon sealant, epoxy sealant, urethane sealant, polyisobutylene sealant, or acrylic sealant.

* * * * *